United States Patent [19]
Urech et al.

[11] Patent Number: 5,929,765
[45] Date of Patent: *Jul. 27, 1999

[54] METHOD AND APPARATUS FOR POSITIONING AND ALIGNING WORKPIECES

[75] Inventors: Werner Urech, Kaiserstuhl; Marcus Rainer Luessi, Italsen, both of Switzerland

[73] Assignee: Elpatronic AG, Bergdietikon, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/735,829

[22] Filed: Oct. 23, 1996

[30] Foreign Application Priority Data

Nov. 20, 1995 [CH] Switzerland .......................... 03272/95

[51] Int. Cl.⁶ .................................................. G08B 21/00
[52] U.S. Cl. .................. 340/674; 72/31.01; 219/121.31; 340/686.2; 340/686.5
[58] Field of Search ..................................... 340/674, 686, 340/686.2, 686.5; 269/329; 29/559; 72/31.01; 219/650, 121.13, 121.14, 121.31, 121.32, 121.45, 121.46, 121.63, 121.64

[56] References Cited

U.S. PATENT DOCUMENTS

| | | | |
|---|---|---|---|
| 3,357,690 | 12/1967 | Firestone | 219/121.39 X |
| 3,488,229 | 1/1970 | Firestone | 219/121.44 X |
| 4,192,055 | 3/1980 | Moore | 29/281.4 |
| 5,261,265 | 11/1993 | Nichols | 72/420 |

FOREIGN PATENT DOCUMENTS

| | | |
|---|---|---|
| 1 527 304 | 6/1969 | Germany . |
| 1719184 | 3/1992 | U.S.S.R. . |

*Primary Examiner*—Thomas Mullen
*Attorney, Agent, or Firm*—McCormick, Paulding & Huber

[57] ABSTRACT

A method for positioning and aligning workpieces, in particular one or more metal plates that are to be joined, against at least one stop, involves transmitting a position signal, preferably an electrical signal, between the workpiece and the stop, and using the workpiece and the stop as signal transmitters.

11 Claims, 7 Drawing Sheets

METHOD AND APPARATUS FOR POSITIONING AND ALIGNING WORKPIECES

BACKGROUND OF THE INVENTION

The invention relates to a method for positioning and aligning workpieces, in particular one or more metal plates that are to be joined, against at least one stop, as well as apparatus therefor.

There are many instances in industrial production where it is necessary to join together two sheet-form workpieces. This is the case, for example, with workpieces used in automobile manufacture. The workpieces in question are usually two or more plates of sheet metal, although in some instances they may have a contour other than that of a rectangle. These metal plates are intended to be joined together by, for example, mash seam welding, laser welding or the like. For the purposes of the present invention it is immaterial which type of connection is chosen.

What is important for all these workpieces intended to be joined together is that they should be in exact alignment with one another. If, for instance, they are to be joined together by a mash welding operation, they will overlap at the edges. However, the amount of overlap must be very accurately chosen. If, for instance, the two workpieces are to be joined together by laser welding, then the gap between the two edges of the workpieces to be butt-jointed to one another must not exceed a given width, say 0.08 mm. Therefore it is extremely important that the workpieces should be positioned and aligned with respect to one another before they are fed to the joining apparatus. Of course, this applies not only when two workpieces are being joined together, but also when a workpiece is to be joined to, for example, two, three or more other workpieces.

Currently this positioning is done manually or automatically, with the workpieces intended to be joined together being placed against stops provided for the purpose. These stops are situated in the apparatus between the clamping fixtures for the two metal sheets, or else on feed tables which feed the metal sheets to the clamping fixtures. Common to both alternatives is the fact that owing to the cramped conditions inside the apparatus it is not possible to monitor whether the workpieces really are up against the stops before they are clamped and are thus being gripped in the correct position.

SUMMARY OF THE INVENTION

It is an aim of the present invention to assist the accuracy of the workpiece positioning operation.

Towards this aim, there is provided by method of the aforementioned kind, in which a positioning signal is transmitted between the workpiece and the stop and the workpiece and the stop are used as signal transmitters.

Any desired signal may be used as the signal transmitted between the workpiece and the stop. Suitable signal carriers include ultrasound or magnetic waves, but especially electric current which is able to flow between the stop and the workpiece.

The method may be performed by moving the workpiece to be positioned up to its stop, for example by driven rollers or some other feed device such as a robot. If there is a signal flow between the workpiece and the stop, this confirms that the workpiece is actually up against the stop, or in direct contact with the stop. If there is no signal flow, this means that the workpiece is not yet in position relative to the stop and needs to be realigned.

A signal may flow from the workpiece to the stop or, vice versa, from the stop to the workpiece, and be intercepted there. However, since it is preferable for a plurality of stops to be provided for a workpiece, it may be advisable to connect the workpiece to the source of the signal. Then if the individual stops are connected to a suitable current measuring device, it can be ascertained in a straightforward manner whether every stop is in communication with the signal generator, ie. whether the workpiece actually is resting against each stop, as desired. If there is no feedback from a stop this will mean that the workpiece is not properly positioned and needs to be realigned.

As a rule the workpieces involved are rectangular, or shaped blanks with at least one straight edge, namely the weld edge, which are to be positioned transversely and lengthwise relative to a conveying direction. Because they will later be joined together, for example by mash or laser welding, importance is attached primarily to their mutual alignment, ie. the alignment of their edges that are to be joined to one another. For this reason it is preferable to provide two stops for these edges, and to arrange said stops spatially separate from one another. It is usual to place one stop near the front end of the workpiece and one stop near the back end in the conveying direction.

In the case of the apparatus in standard use today for joining two workpieces, it is usual for not just two workpieces to be positioned and fed to the joining device, but for a number of workpieces to be aligned relative to one another, in pairs or depending on the desired number concerned, then clamped and fed to the joining device. It is important that all the workpieces that are to be joined together should also be correspondingly aligned. This means that a large number of stops will need to be monitored in such apparatus. In addition there is the fact that it will usually be necessary to monitor a front and/or a rear stop for each workpiece. It is even possible in respect of such monitoring to connect each stop to a corresponding receiver, thereby enabling it to be detected in respect of each stop whether the latter is in contact with the workpiece or not. This, however, necessitates running a large number of connection conductors between the stops and a receiver.

In order to simplify this method of monitoring a plurality of stops, it is for example feasible to interrogate stops belonging to different workpieces in sequence. It may then suffice if workpieces are connected in succession to a voltage source, yet their stops communicate with the receiver via a common connection conductor.

It is also feasible for different workpieces to be acted on by a different voltage, frequency or current strength, or alternatively by current pulses of different lengths. It merely has to be ensured that the receiver can recognise and display the various signals. This eliminates the need for a large number of connection conductors, for it is always possible to connect a series of stops to one conductor. It is, for example also feasible to vary the number of current impulses in respect of successive workpieces.

There is also the possibility of restricting current flow directions, for example by the use of diodes. This enables a workpiece to interact with two stops, both of which are allocated to one current conductor. In the case of one stop the diode prevents current from flowing from the conductor to the workpiece, yet allows current to flow from the workpiece to the conductor. The other diode is connected the other way around.

To position a plurality of workpieces in apparatus for joining the said workpieces, for example in a mash seam welding machine or laser welding machine, it is preferable to arrange the stops on rotatable stop shafts, so that they can be swivelled inwards by rotation of the stop shafts to position the workpieces. This involves the provision of a rotatable stop shaft for the workpieces arriving on the left-hand side and a stop shaft for the workpieces arriving on the right-hand side, with the result that these stop shafts are preferably situated one above the other. The stop shafts can be used to carry the connection cables for the stops. However, the stop shafts themselves may also be in the form of conductors, and many options for this are feasible and are within the scope of the present invention.

Rotating the stop shafts causes the stops to swivel into the transverse guide of the workpieces, thereby causing the said workpieces to bear against the stops. If the workpieces are to overlap, as for example for mash seam welding these workpieces must be separate from one another for electrical monitoring of the stops. This can for instance be done by aligning the workpieces with one another at different heights and only placing them upon each other when they are finally being clamped in position. Another possibility is to first position the lower workpiece, determine the position, clamp this workpiece, and then to bring the upper workpiece into contact with its stops and pass current through it.

In other cases it may prove advisable to insulate some of the stops themselves, in order to avoid unwanted current flow between the different workpieces.

It should be emphasised that the present invention need entail minimum expenditure on switch elements, wiring and the possibility of rapid interrogation even at inaccessible locations. The method and apparatus according to the invention can be employed wherever a plurality of metal sheets have to be simultaneously positioned and monitored. Although the method is particularly useful in helping to join two metal sheets, it should not be construed as being confined thereto.

Whereas hitherto the workpieces have been pre-positioned in a pre-positioning station and conveyed by robot into the actual machine for joining the workpieces, under the present invention the pre-positioning can substantially be dispensed with or made very simple. For example it is sufficient if the workpieces rest against centering pins on an inclined plane, for the actual positioning and alignment then to be performed and checked in the machine itself. This is also the case when a robot is used for feeding the workpieces. Omitting the pre-positioning station considerably reduces the amount of space required and simplifies the entire machine loading operation.

BRIEF DESCRIPTION OF THE DRAWINGS

Further advantages, features and details of the invention can be ascertained from the following description of preferred examples of embodiments and from the accompanying drawings wherein.

DESCRIPTION OF THE PREFERRED EMBODIMENTS

Figure 1:
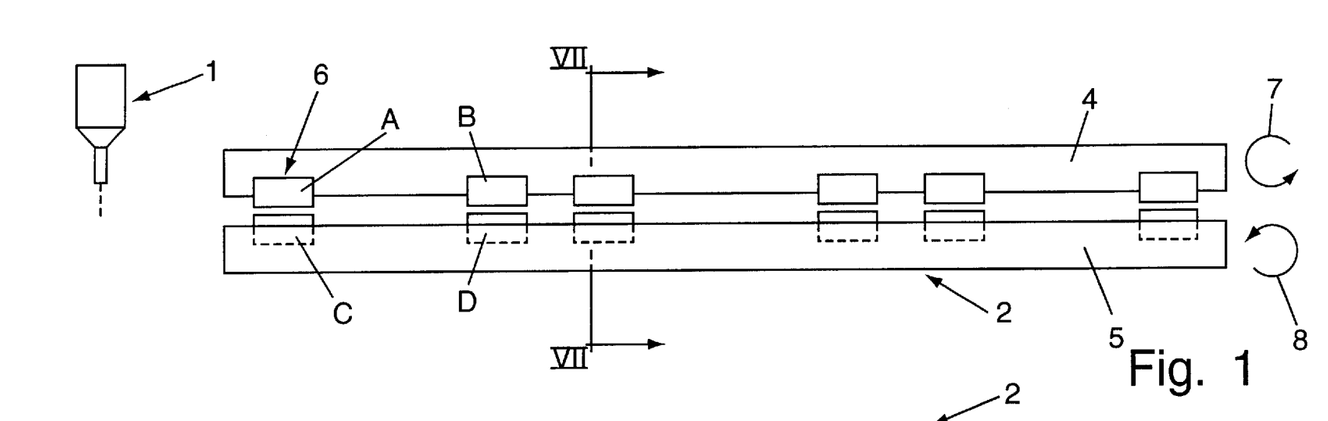
FIG. 1 is a schematic side-view of a part of one example of apparatus according to the invention for joining two sheet workpieces.
Figure 2:
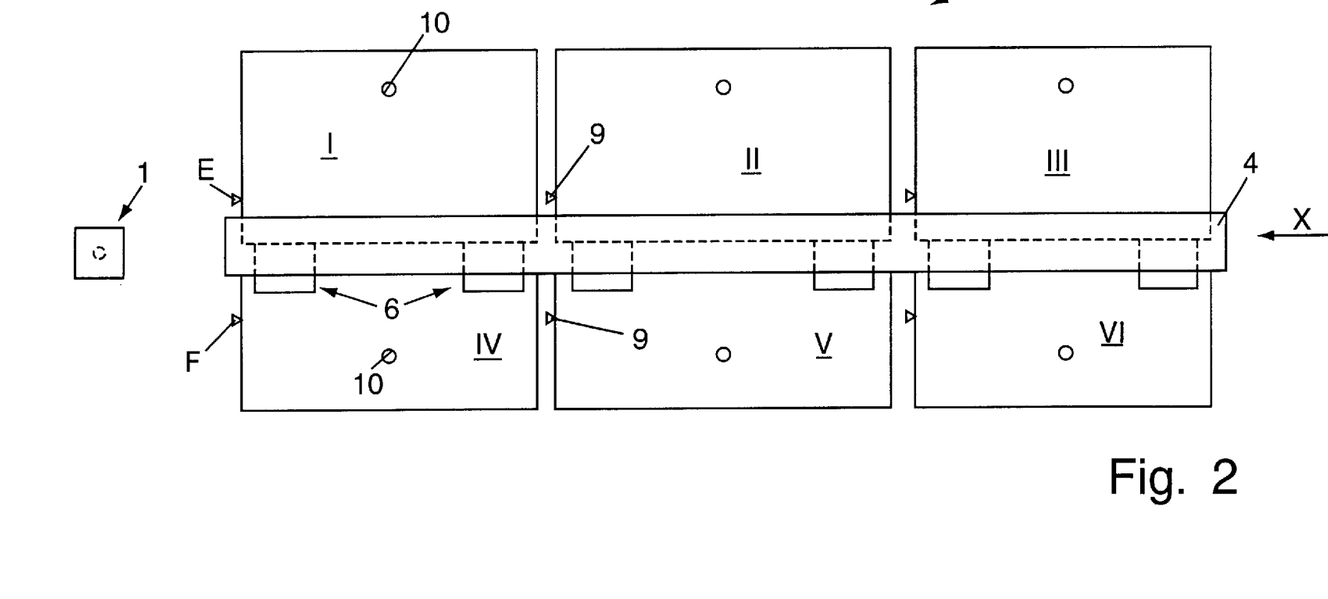
FIG. 2 is a schematic top view onto the part of the apparatus for joining two sheet workpieces represented in FIG. 1.

FIG. 1 and 2 depict a part of an apparatus for joining sheet workpieces I–VI. These workpieces I–VI are to be joined pairwise to one another, with the edges able to be butted together and for example joined together using a laser beam. The workpieces I–VI may also, however, overlap in a marginal edge region and be joined to one another by mash seam welding.

Any desired method of joining may, however, be used, such as welding, bonding, crimping, etc. For joining workpieces I–VI pairwise just one joining device 1 has been schematically depicted.

Figure 10:
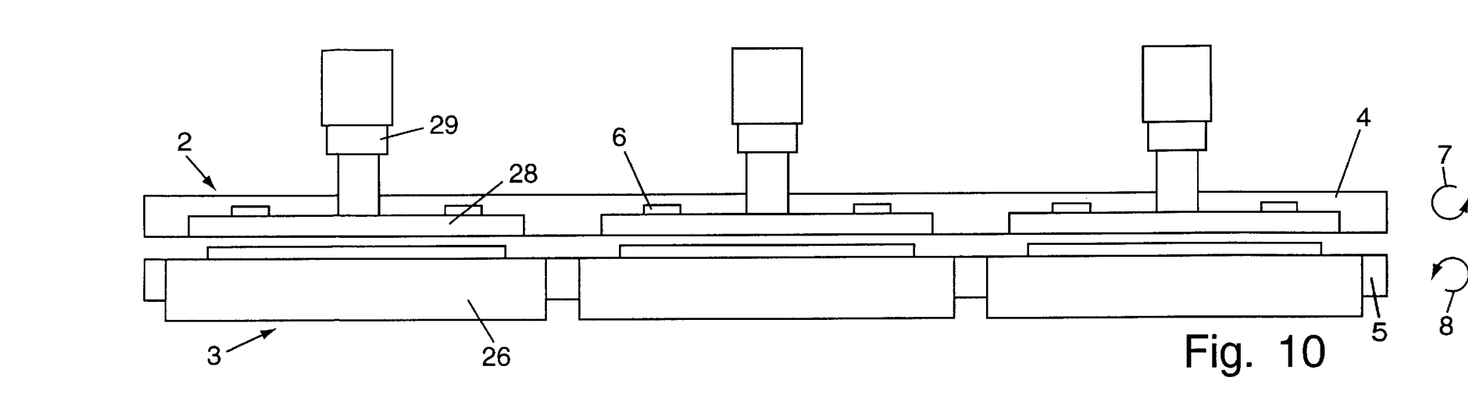
FIG. 10 is a schematic side view of the part of the apparatus seen in FIG. 1, showing the clamping and conveying elements.
Figure 11:
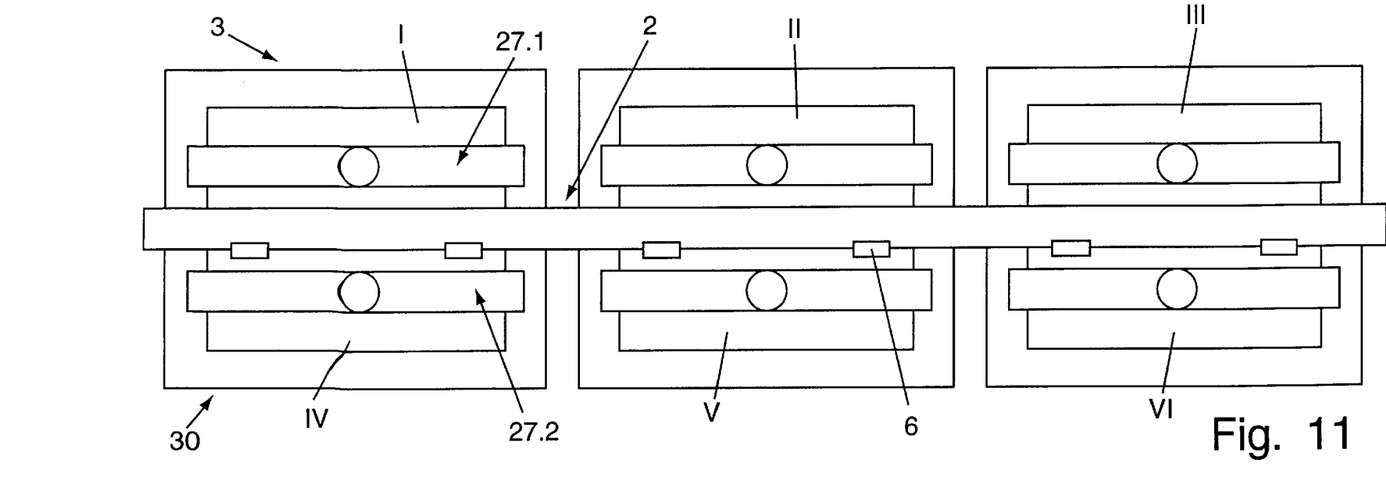
FIG. 11 is a top view onto the parts of the apparatus seen in FIG. 10.

Connected upstream of the joining device 1 is a stop monitoring device 2 and a conveying device 3 indicated in FIGS. 10 and 11 for the sheet workpieces I–VI.

In FIG. 1 stops 6 for the sheet workpieces I–VI are arranged on two stop shafts 4 and 5. If, therefore, it is a question of joining the workpieces in each of the three pairs of workpieces I–VI to one another, there will be six stops 6 on the upper rotary shaft 4, and in each case a stop A will be arranged close to a front region of the sheet workpiece I–III and a stop B close to the rear region of the sheet workpiece I–III, Likewise there are also six stops on the lower stop shaft 5, with in each case a stop C allocated to the front region of the sheet workpiece IV–VI and a stop D allocated to the rear region. In the present example the two stop shafts 4 and 5 rotate in an anti-clockwise direction, as indicated by the arrows 7 and 8.

It is preferable to perform stop monitoring for the sheet workpieces I–VI not only in a transverse direction but also in the conveying direction X. Suitable stops 9 are provided for this, the right-hand stops 9 being identified as E and those on the left hand as F.

An important feature of the apparatus shown is that, for monitoring the stops, the sheet workpieces I–VI are connected to a voltage source 10 which is indicated only schematically in FIG. 2. The pre-condition for this is that the sheet workpieces I–VI consist of a current-conducting material, as specifically is the case with metal plates. The individual stops 6 and 9 are then inspected either consecutively or together to see whether a current is flowing from the voltage source 10 to the stops, 6 and 9 respectively. Only thus is it confirmed that the sheet workpieces I–VI actually are resting against the stops, 6 and 9.

Figure 3:
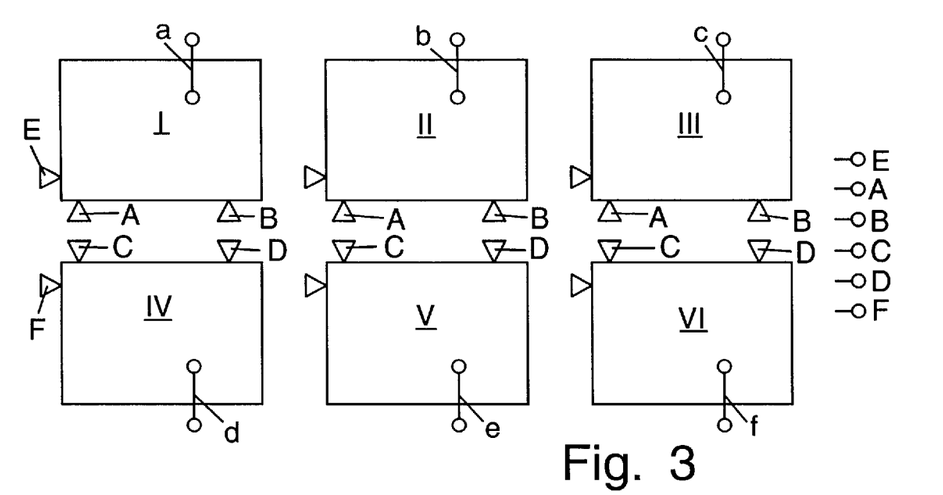
FIG. 3 is a schematic top view onto a stop monitoring device in accordance with the invention, for the sheet workpieces.
Figure 4:
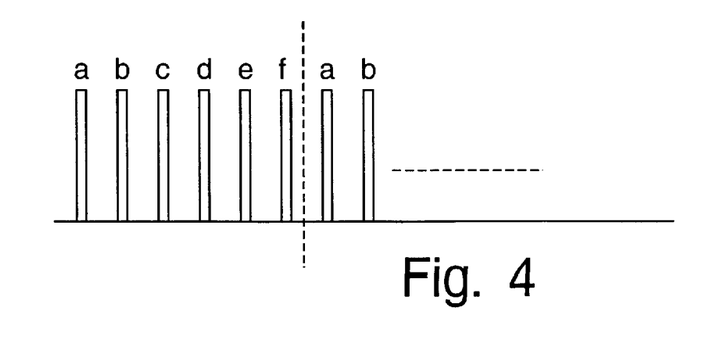
FIG. 4 is a diagrammatic representation of pulse signals from a transmitter for checking the stop for the sheet workpieces.
Figure 5A:
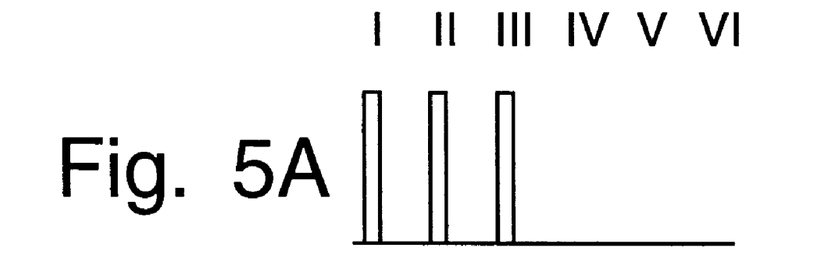
FIG. 5 is a diagrammatic representation of signals detected by a receiver and sent by a transmitter as seen in FIG. 4.
Figure 5B:
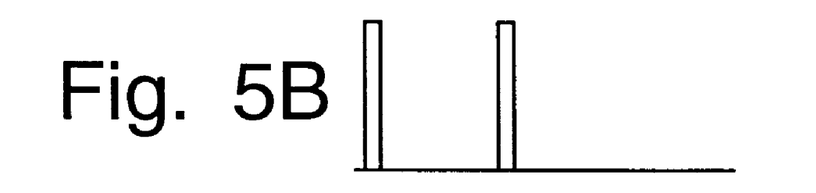
Figure 5C:
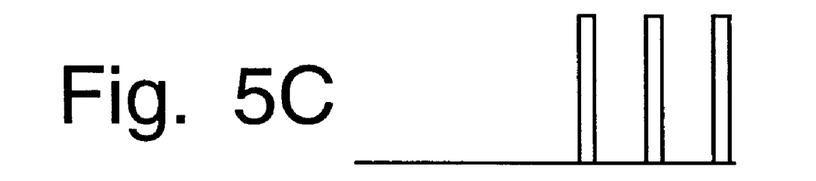
Figure 5D:
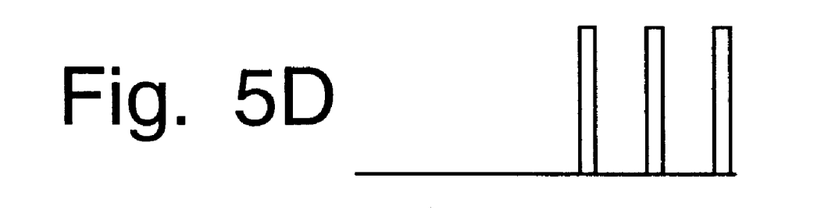
Figure 5E:
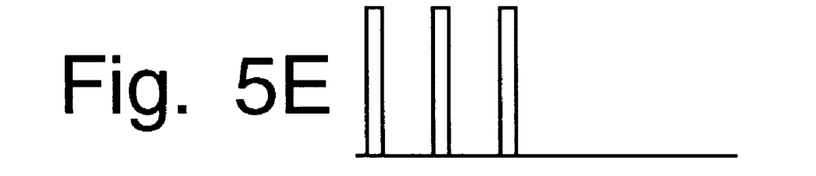
Figure 5F:
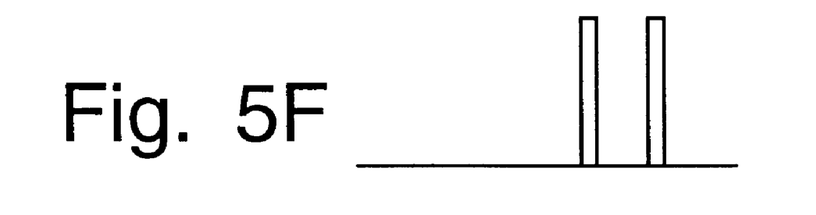

In any case, it also seems possible for a particular stop, 6 or 9 respectively, associated with a workpiece I–VI to be connected to a voltage source, thereby enabling it to be detected whether the workpieces I–VI are bearing against all the stops 6 and 9. Of course it is not possible to tell from this whether a workpiece I–VI is for example only resting against a front stop A or C or only against a rear stop B or D. Therefore preferably each stop 6 and 9 as indicated in FIG. 3 is sampled and each workpiece I–VI is connected to a voltage source 10. Each workpiece I–VI has its own allocated current terminal a–f, (FIG. 3) which supplies a test signal as shown in FIG. 4. A suitable receiver picks up and records these test signals as indicated in FIG. 5. For every workpiece I–VI the receiver has to receive three test signals. If each stop A–F is sampled separately it can be accurately determined which workpiece is not bearing against which stop. For example, in FIG. 5 workpiece II is not resting against its rear stop B and workpiece VI is not resting against its longitudinal stop F.

Figure 6:
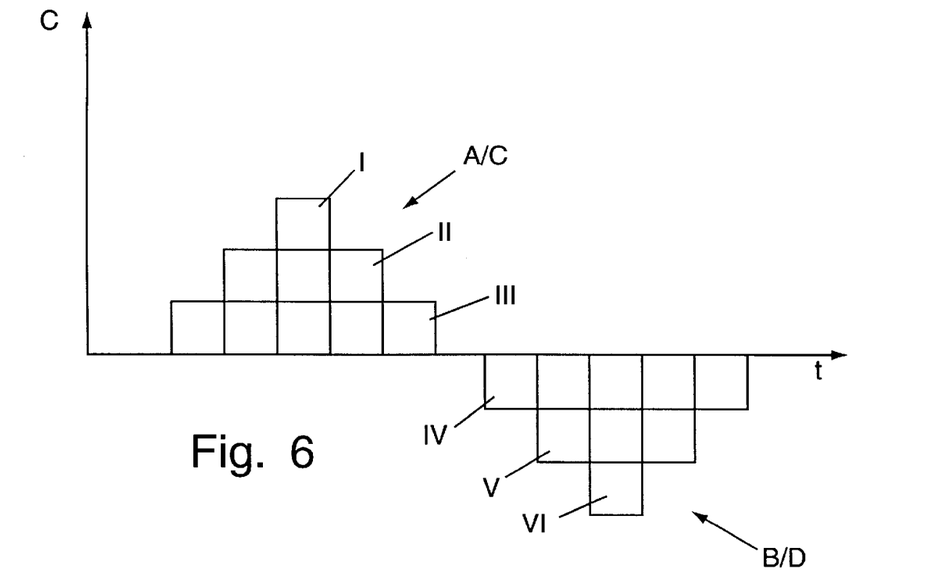
FIG. 6 is a diagrammatic representation of another example of signals received for detecting the stop engagements by sheet workpieces.

In another embodiment, all the front stops, A and C respectively, and all the rear stops, B and D respectively, are in each case connected in common to a receiver. A different pulse voltage C is sent to each workpiece I–VI over a different pulse length t. If all the workpieces I–VI are up against the stops A to D, the result is the picture shown in FIG. 6. If any workpiece is not in contact, its square-wave signal will be absent for a corresponding stop A to D. A similar result can also be achieved using differences in frequency.

It is also possible to interrogate the individual workpieces in a timed sequence. This could then be done at the same voltage and the same frequency for each stop.

Figure 7:
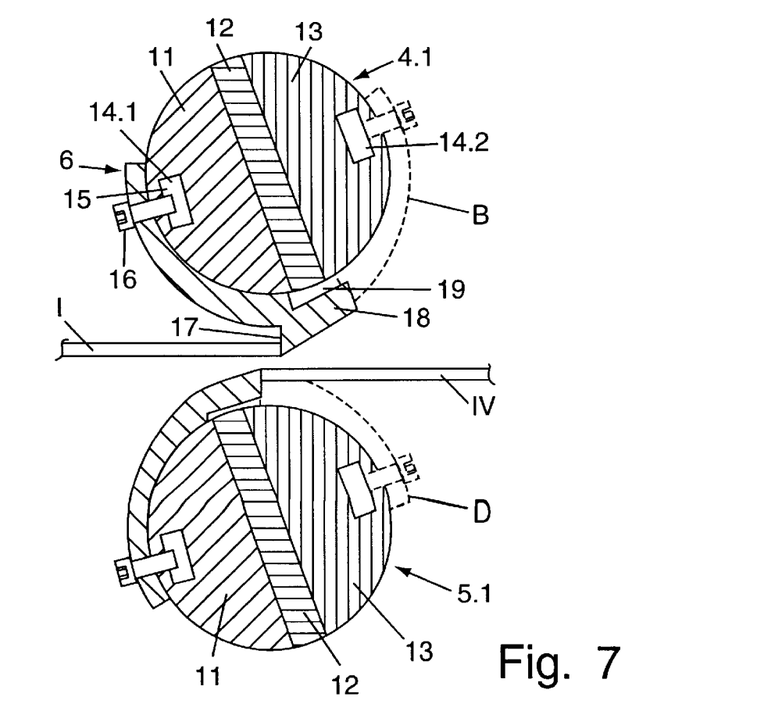
FIG. 7 is a cross-section view taken through part of the apparatus along line VII—VII in FIG. 1.

Both in the case of the last-mentioned possibility and in the case where all the stops 6 and 9 are simultaneously interrogated at different voltages or different frequencies over time, it is possible to combine all the stops 6 on a respective stop shaft 4.1 or 5.1 as seen in FIG. 7. In this case it is helpful to construct at least a part 11 of the shaft 4.1 or 5.1 so as to conduct current continuously. This conducting part 11 is preferably united by an insulating layer 12 with a second part 13 which in longitudinal section is roughly half-moon shaped and which likewise conducts current. In this manner it is possible to join stops 6 pointing in any desired direction to the rotating shaft, 4.1 and 5.1 respectively. For this purpose undercut receiving slots 14.1 and 14.2 respectively, are incorporated in each case in the conducting part 11 or the conducting part 13 of the stop shafts, 4.1 and 5.1, and into said slots are inserted corresponding sliding blocks 15 which receive screw bolts 16. The screw bolts 16 are used to fix their respective stops 6 on the stop shaft, 4.1 and 5.1. Each stop 6 has an indented stop edge 17 for a workpiece, I and IV respectively. It can also be seen that a head element 18 on the stop 6 lies with a gap 19 from the stop shaft, 4.1 and 5.1 respectively, with the result that the stop 6 does not short-circuit the conducting part 13.

Here again it is considered preferable to separate the front stops A and C from the rear stops B and D. In this case a rear stop, B or D, indicated by a dashed line, is placed on the conducting part 13 and joined to the stop shaft, 4.1 and 5.1 respectively, to match the stop, A or C respectively, for the front part of the workpieces I–VI.

Figure 8:
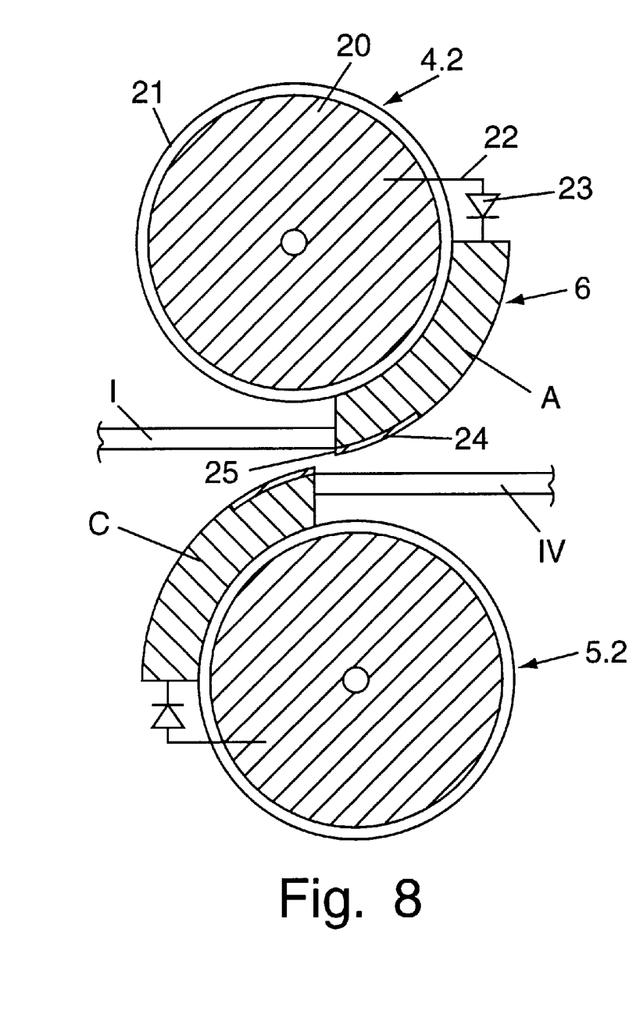
FIG. 8 is a similar cross-section view in another example of a stop monitoring device, similar to FIG. 7, at the start of a workpiece.
Figure 9:
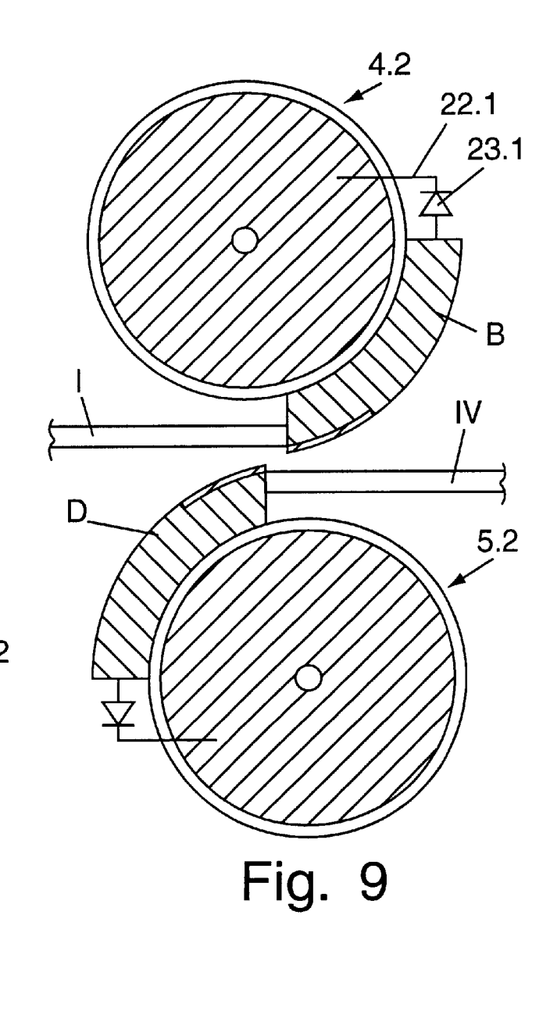
FIG. 9 is a further cross-section view in the example of a stop monitoring device seen in FIG. 8, at the end of the workpiece.

In the further embodiment of stop shafts 4.2 and 5.2, shown in FIGS. 8 and 9, a core 20 made of conductive material is provided in each case and is surrounded by an insulating layer 21. The core 20 is connected electrically to the stop 6, and a diode 23 is wired into a junction 22 of the connection. The diode 23 allows current to pass from the stop A at the start of the workpiece I to the stop B at the end of the workpiece through a diode 23.1 which is inserted in a junction 22.1 and is wired in the opposite direction.

As a rule the workpieces I and IV and the other workpiece pairs II/V and III/VI are set very close together, which means that there is a risk of current passing from one stop or workpiece to the other stop or the other workpiece. As illustrated in FIGS. 8 and 9, this can be prevented by incorporating an insulating area 24 on the stop 6 and, if appropriate, forming it with a nose 25 so that it projects beyond the workpiece, I and IV respectively, with the result that an electrical connection cannot be made between the two workpieces I and IV.

FIGS. 10 and 11 also show a possible form of conveying device 3. The important thing is that once the workpieces I–VI have been positioned against their stops they should remain as undisturbed as possible and sent to the joining device 1. This task can, for example, be done by a table 26 on which clamping fixtures 27.1 and 27.2 are arranged on either side of the stop monitoring device 2. Each clamping fixture preferably consists of a pressure beam 28 and a hydraulic ram 29. The clamping fixtures 27.1 and 27.2 are used to locate the workpieces I–VI on the respective tables 26. Together the table 26 and the clamping fixtures 27 form a shuttle 30.

As soon as the workpieces I–VI are positioned against the associated stops 6 and it has been determined that all the workpieces I–VI are resting against the stops 6, the clamping fixtures 27 are brought into action and they press the workpieces I–VI against the tables 26. Rotating the stop shafts 4 and 5 now in the direction of the arrows 7 and 8 swivels the stop 6 away, thereby releasing the workpieces I–VI. Each shuttle 30 can then be moved to the joining device 1, the workpieces I–VI being guided along between the stop shafts 4 and 5.

Figure 12:
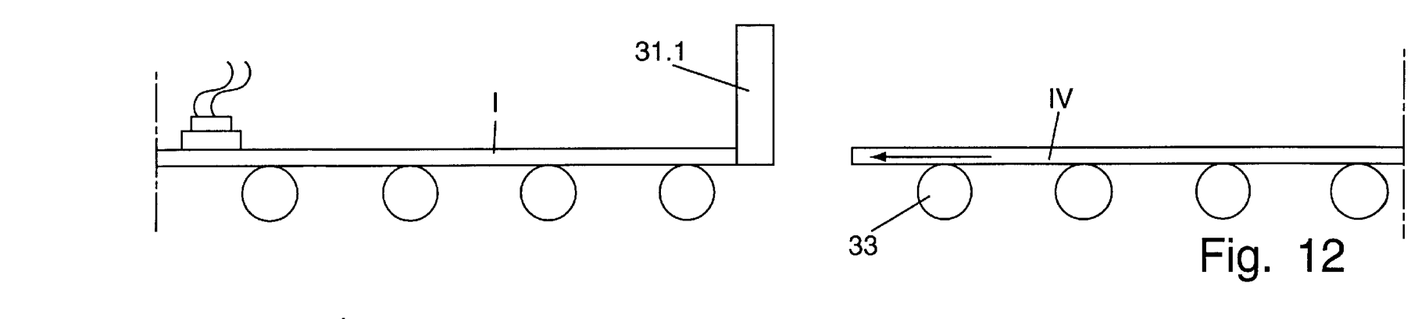
FIG. 12 is a schematic frontal view of part of another embodiment of apparatus according to the invention for joining two sheet workpieces.
Figure 13:
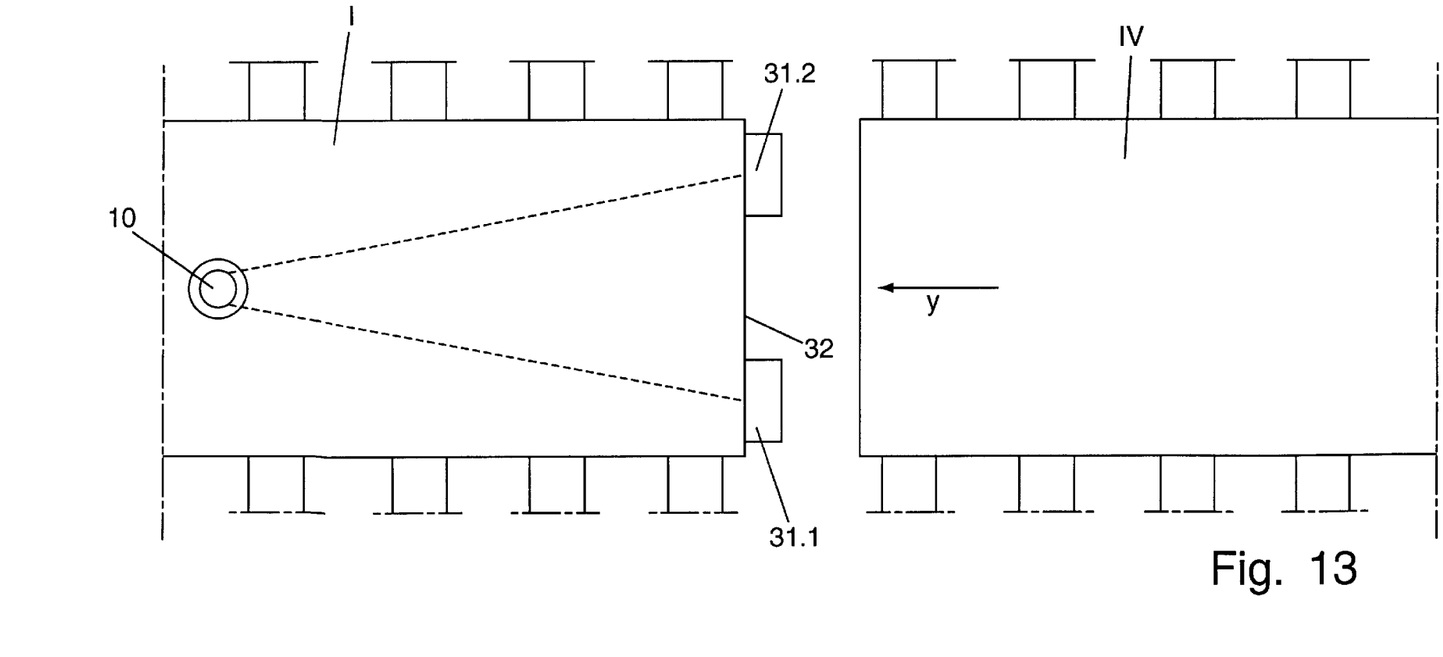
FIG. 13 is a schematic top view onto the parts of the apparatus seen in FIG. 12.

Whilst the stop monitoring device 2 outlined so far is primarily suitable for joining two workpieces I–IV so that they overlap, FIGS. 12 and 13 also show how it is possible to butt-joint two workpieces I and IV. However, exact positioning of the workpieces I against the stops requires two abutment elements 31.1 and 31.2, which like the stops 6 are able to receive and pass on a current pulse from the voltage source 10. This ensures that one edge 32 can be positioned and clamped as a reference edge.

After that the abutment elements 31.1 and 31.2 are removed and the workpiece IV to be joined is moved in the direction y against the workpiece I.

A roller conveyor 33 is used to move the workpiece I and IV.

We claim:

1. Method for positioning and aligning a conductive workpiece against a stop for joinder with another workpiece, characterized by creating a position signal potential between the conductive workpiece and the stop by connecting a position signal source directly to the conductive workpiece and the stop; and transmitting a position signal between the conductive workpiece and the stop using the conductive workpiece and the stop as transmitters for the position signal.

2. Method according to claim 1, further characterized by detecting the position signal between the conductive workpiece and the stop when the two are mutually in contact.

3. Method according to claim 1, characterized in that the position signal source is a voltage source.

4. Method according to claim 1, characterized in that the conductive workpiece is brought into contact with at least two spatially separated stops, and the steps of creating and transmitting include using the position signal for detecting contact between the conductive workpiece and each of the two stops.

5. Method according to claim 4, characterized in that one edge of the conductive workpiece is brought into contact with one of the two spatially separated stops and a further edge is brought into contact with the other of the two spatially separated stops.

6. Method according to claim 1 characterized by:
   simultaneously bringing each of a plurality of successive conductive workpieces into contact with a plurality of associated stops respectively; and
   creating and transmitting a plurality of position signals respectively between the plurality of successive workpieces and the associated stops, each of the plurality of position signals being distinguishable from the others.

7. Method according to claim 6 characterized in that the position signal source is a voltage source and each of the plurality of position signals has a different voltage.

8. Method according to claim 6 characterized in that the position signal source is a pulsed signal source, and each of the plurality of position signals has characteristic pulses different from the other position signals.

9. Method according to claim 8 wherein the characteristic pulses differ in timing.

10. Method according to claim 8 wherein the characteristic pulses differ in voltage.

11. Method according to claim 6 characterized in that the position signal source is a voltage source and each of the plurality of position signals has a different timing.

\* \* \* \* \*